(12) United States Patent
Vaage

(10) Patent No.: US 7,719,764 B1
(45) Date of Patent: May 18, 2010

(54) METHOD AND DEVICE FOR STEREO PROJECTION OF PICTURES

(75) Inventor: Joar Vaage, Stavanger (NO)

(73) Assignee: Cyviz AS (NO)

( * ) Notice: Subject to any disclaimer, the term of this patent is extended or adjusted under 35 U.S.C. 154(b) by 0 days.

(21) Appl. No.: 09/936,390

(22) PCT Filed: Mar. 2, 2000

(86) PCT No.: PCT/NO00/00076

§ 371 (c)(1),
(2), (4) Date: Sep. 10, 2001

(87) PCT Pub. No.: WO00/55687

PCT Pub. Date: Sep. 21, 2000

(30) Foreign Application Priority Data

Mar. 15, 1999 (NO) .................................. 19991265

(51) Int. Cl.
*G02B 27/22* (2006.01)
*H04N 13/02* (2006.01)
*H04N 13/04* (2006.01)

(52) U.S. Cl. ......................... 359/462; 348/46; 348/58

(58) Field of Classification Search ................. 359/462, 359/465, 464, 466, 467, 468, 469; 348/57, 348/58, 46, 56, 43, 47, 386, 51, 54; 353/7, 353/8; 345/7, 419; 34/46
See application file for complete search history.

(56) References Cited

U.S. PATENT DOCUMENTS

| 4,954,890 | A | * | 9/1990 | Park ............................ 348/58 |
| 5,416,510 | A | * | 5/1995 | Lipton et al. ................... 348/43 |
| 5,523,886 | A | | 6/1996 | Johnson-Williams et al. |
| 5,726,703 | A | * | 3/1998 | Izawa et al. .................... 348/46 |
| 5,959,663 | A | * | 9/1999 | Oba et al. ...................... 348/46 |
| 5,982,538 | A | * | 11/1999 | Shikama et al. ............... 359/465 |

FOREIGN PATENT DOCUMENTS

| EP | 0 851 691 A2 | 7/1998 |
| GB | 2 324 939 A | 11/1998 |
| WO | WO 94/14104 | 6/1994 |
| WO | WO 96/32665 | 10/1996 |

* cited by examiner

*Primary Examiner*—Audrey Y Chang
(74) *Attorney, Agent, or Firm*—Andrus, Sceales, Starke & Sawall, LLP

(57) ABSTRACT

A device for stereo projection of pictures represented by a picture signal which alternates periodically between pictures intended for right eye and pictures intended for left eye. A page selector which is adapted to transmit picture signals for first and, thereupon, each odd number picture to one projector and second and, thereupon, each even number picture to another projector.

6 Claims, 2 Drawing Sheets

METHOD AND DEVICE FOR STEREO PROJECTION OF PICTURES

FIELD OF THE INVENTION

The invention relates to a method and a device for stereoprojection of pictures.

BACKGROUND OF THE INVENTION

Our depth sight is connected with the fact that the right and left eyes see the surroundings from a different place and under a somewhat different angle. One eye sees a picture differing from the picture that the other eye sees, and the brain co-ordinates the two such that we experience three dimensions.

It is known to create pictures with a three-dimensional effect by letting each right and left eye see a picture of its own, e.g. two photos taken from two points spaced correspondingly to a normal mutual distance between the eyes of a human being. There exist special cameras for such purposes, so-called stereo cameras, having two objectives.

In recent years, techniques used in order to achieve three-dimensional effect in photos, developed to comprise pictures that can be transferred electronically, such as video and digitized images, and a technique has been developed that makes it possible to show both still pictures and moving pictures on screen.

To let a viewer experience three-dimensional effect, the picture photographed or made in some other way for the right eye must be shown for the right eye, and the picture photographed or made in some other way for the left eye, must be shown for the left eye. If both pictures are shown for both eyes, a blurred (unsharp) picture is experienced, and the three-dimensional effect fails.

In order to avoid the right eye seeing the picture belonging to left eye, and vice versa, the pictures may be viewed through an ocular for each eye, in a so-called stereoscope. This gives a good three-dimensional effect, but it is not very suited for pictures to be viewed by several persons simultaneously, e.g. in a cinema hall.

It is known to divide a right and left picture in narrow stripes which are assembled alternately to form one picture. When viewing the picture stripes through glass or plastic, where prisms are formed parallel to the pictures stripes, the result is that the right eye sees picture stripes belonging to right picture, and that the left eye sees picture stripes belonging to left picture.

Further, it is known to print two pictures, one for the right eye and one for the left eye in registry on paper. Such pictures are viewed through special spectacles separating the pictures from each other, so that the right eye sees one picture and the left eye sees the other picture.

In one type of spectacles, spectacle glasses having different color for each eye are used, such as a red and a bluish green. Each picture is prefiltered before printing. The right picture is printed in complementary color to the left picture and left spectacle glass, and vice versa. Then, each eye sees a different picture. The technique is also used when projecting two pictures in registry on a screen (canvas), and it is possible to show moving pictures, film and animations in this way.

The technique which also may be used for television, has several disadvantages. The filtration and the spectacle glasses influence the color balance, and an adequate separation of the pictures for right and left eye is not achieved. Each eye experiences a portion of the picture meant for the opposite eye and the picture is, thus, experienced as unsharp.

Another known way of separating pictures for the right and left eyes consists in that a picture for each eye is projected in registry on a screen by means of polarized light. The polarization for the one picture is at right angles to the polarization for the other, and the viewer uses spectacles having glasses each correspondingly being polarized for letting through light for one of the pictures only. By means of this, less color error is achieved than by using a color filter, and a better picture separation is obtained.

Upon transfer of electronic pictures, such as video pictures, it has been found to be difficult to synchronize two parallel picture signals in a flickerfree way. In connection with projecting video pictures or pictures from computers, it has proved advantageous to transfer picture for alternate right and left eye in a common channel in lieu of in two parallel channels. This means that every second picture transferred, belongs to right eye, while the rest belongs to left eye. The pictures are projected on a screen and are viewed through spectacles having glasses which can shut and open in step with an electric signal alternating synchronously with the pictures. Such spectacle glasses utilize liquid crystals. The left spectacle glass is shut while the right picture is projected, and the right spectacle glass is shut while the left picture is projected.

This known technique gives a good effect, but it has several disadvantages. The spectacles are expensive, and they have to be provided with an electric signal for synchronization with the stream of pictures, which can be difficult in a cinema hall. In practice, the technique is usable only for stationary plants. Also, great demands are made upon the projector which has to operate with double picture frequency. The high picture rate means that reasonable projectors in which the picture is formed by liquid crystals, can not be used.

SUMMARY OF THE INVENTION

The object of the invention is to provide a method and a simplified device in order to achieve stereo projection of pictures represented by a picture signal which cyclically alternates between picture for the right and the left eyes.

The object is obtained by means of features as defined in the following description and the following claims.

According to the invention, a picture signal is received which in known manner alternates between a picture for the right and left eyes.

The first picture received in incoming picture signal, is decoded and, possibly, digitized into a first digital picture which is stored in a first digital storage device, typically a cache memory in a computer. The first digital storage device is searched as known, and from the content is formed an outgoing first picture signal. The second picture received in incoming picture signal, is decoded and digitized correspondingly to the first picture, and is stored in a second digital storage device. The second digital storage device is searched, and from the content is formed a second outgoing picture signal. Following pictures received in incoming picture signal are, thereupon, stored alternately in the first and second digital storage devices.

The first outgoing picture signal is passed to a first projector, and the second outgoing picture signal is passed to a second projector. Even if the incoming picture signal has double picture rate, each projector operates with a normal picture rate, so that ordinary projectors can be used.

Each of said first and second digital storage device may advantageously be divided into two or more areas used cyclically. Thus, a third picture can be received, decoded, digitized and stored separately from the first picture and without overwriting the same. A fifth picture may be stored at the same place as first picture and overwrite the same, while the third picture is intact and may be projected during receipt and storing of the fifth picture.

Correspondingly, a fourth picture can be received, decoded, digitized and stored separately from the second picture, without overwriting the same. A sixth picture can be stored at the same place as the second picture and overwrite the same while the fourth picture is projected.

With such a division and cyclic use of first and second digital storage devices, great tolerance in respect of the picture rate in incoming picture signal is achieved. This is a great advantage when the picture signals are transferred through a data network where the transfer speed may vary greatly, and where picture data may get lost.

The picture from one projector is projected such that it can be viewed by one eye, and the picture from the other projector is projected such that it can be viewed by the other eye. In a preferred arrangement, a picture from first and second projectors is projected in registry on a screen by means of polarized light, and the pictures are viewed through spectacles having polarized glass, such as explained.

By means of the invention is achieved that each and every projected picture can be renewed in a cycle that only depends on the frequency with which the digital storage devices are scanned. Even if this may involve that the same picture is shown several times if the incoming picture rate descends, a substantial reduction of flicker is obtained as compared with a known technique where picture projection follows the incoming picture rate.

A device for carrying out the described method is described in the following by means of two exemplary embodiments, and reference is made to attached drawings, wherein:

DETAILED DESCRIPTION OF THE PREFERRED EMBODIMENTS

Figure 1:
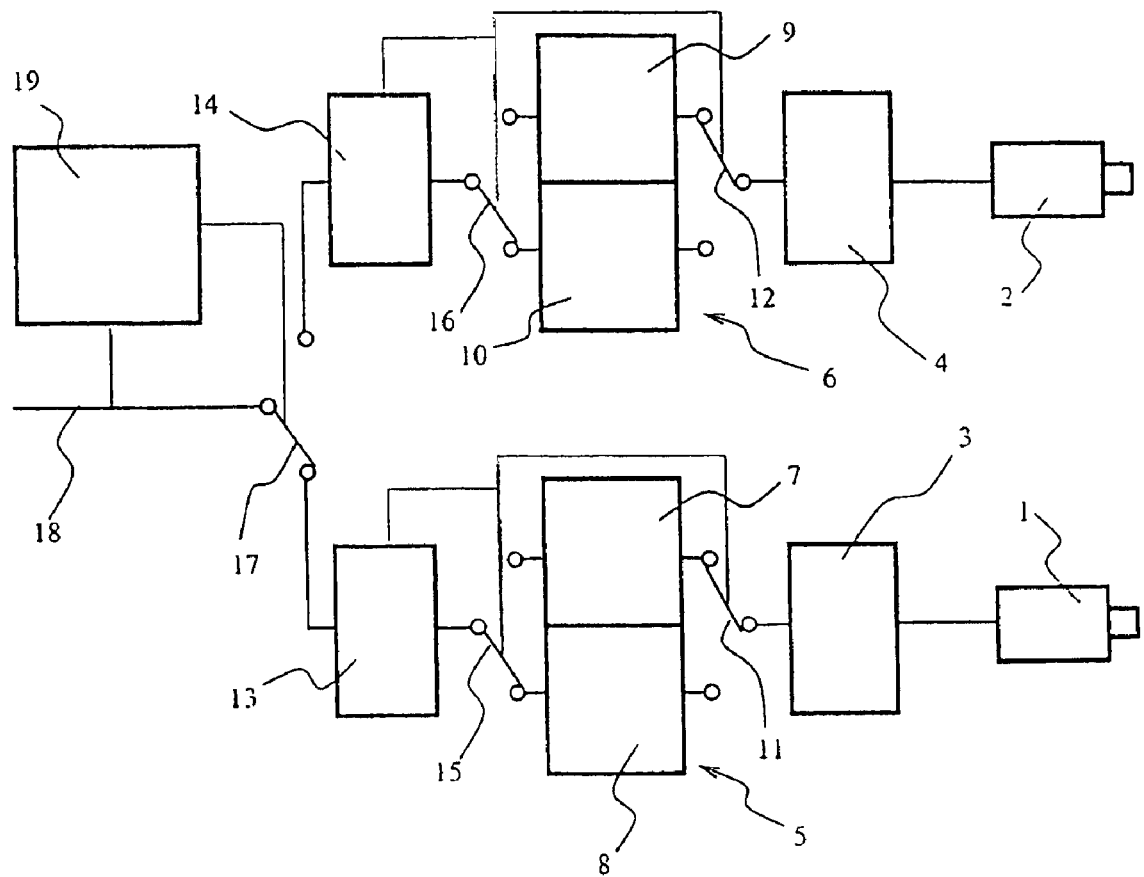
FIG. 1 shows a simplified block scheme for a first embodiment of the invention.

In FIG. 1, the reference numeral 1 denotes a right projector adapted to project a picture to be seen by the right eye, in registry with a projected picture from a corresponding, left projector 2 projecting a picture to be seen by the left eye.

Right projector 1 is coupled to and receives its picture signal from a right picture generator 3. Left projector 2 is coupled correspondingly to a left picture generator 4. Each picture generator 3, 4 is adapted to scan a picture storage and generate a picture signal causing the projector 1, 2 belonging thereto, to project a visible picture belonging thereto, on a screen.

Right picture generator 3 is adapted to scan periodically an area within a right picture storage 5, and left picture generator 4 is correspondingly adapted to scan periodically an area within a left picture storage 6. Right picture storage 5 is divided into a first right picture area 7 and a second right picture area 8. Left picture storage 6 is correspondingly divided into a first left picture area 9 and a second left picture area 10.

A right picture selector 11 is adapted to react on a control signal and connects, alternately, right picture generator 3 to first or second picture area 7, 8 in right picture storage 5 and, thus, determines if right projector 1 projects a picture based on first or second picture area 7, 8. A left picture selector 12 is, correspondingly, adapted to react on a control signal, alternately connecting left picture generator 4 to first or second picture area 9, 10 in left picture storage 6, thus determining if left projector 2 projects a picture based on first or second picture area 9, 10.

A right decoder 13 is adapted to receive a picture signal and store values representing the picture signal, in right picture storage 5 on a format which right picture generator 3 is adapted to convert to picture signals for right projector 1. A left decoder 14 is, correspondingly, adapted to receive a picture signal and store values representing the picture signal, in left picture storage 6 on a format which left picture generator 4 is adapted to convert into picture signals for left projector 2.

Between right decoder 13 and right picture storage 5, is disposed a right area selector 15 adapted to respond to a control signal, alternately connecting the decoder 13 to second or first picture area 8, 7 in right picture storage 5 and, thus, determine whether the decoder 13 stores values in second or first picture area 8, 7. Right picture selector 11 and right area selector 15 alternate such that right picture generator 3 and right decoder 13 are coupled to opposite picture area 7, 8 in right picture storage 5. Intermediate left decoder 14 and left picture storage 6 is, correspondingly, disposed a left area selector 16 adapted to respond to a control signal, alternately connecting the decoder 14 to second or first picture area 10, 9 in left picture storage 6 and, thus, determine whether the decoder 14 is storing values in second or first picture area 10, 9. Left picture selector 12 and left area selector 16 alternate such that left picture generator 4 and left decoder 14 are coupled to opposite picture area 9, 10 in left picture storage 6. A page selector 17 is adapted to respond to control signals and alternately connect a conductor 18 for an incoming picture signal to right decoder 13 or left decoder 14.

A controller 19 is adapted to sense the incoming picture signal and recognize signal values or signal codes defining a new picture and giving switching signals to the page selector 17 for each picture. Right decoder 13 is adapted to give a switching signal to right area selector 15 and right picture selector 11 each and every time the decoder has stored a new picture in right picture storage 5. Left decoder 14 is adapted to give a switching signal to left area selector 16 and left picture selector 12 each and every time the decoder has stored a new picture in right picture storage 6.

Each picture generator 3, 4 feeds a new picture, respectively, to right or left projector 1, 2, following a fixed picture rate, e.g. sixty times per second, even if the incoming picture rate varies. In lack of new picture information, the picture generators 3, 4 will repeat last picture.

The right picture selector may alternate while the right picture generator 3 is in the process of transferring picture signals to the projector 1. Advantageously, the picture generator 3 may be formed with internal storage, not shown, having a capacity for one picture, only scanning right picture storage 5 each time it has completed the transfer of one picture to right projector 1. Thus, a projected picture consisting of parts from two pictures is avoided.

Correspondingly, left picture selector 12 may come to alternate while left picture generator 4 is in the course of transferring picture signals to the projector 2. Advantageously, the picture generator 4 may also be formed with internal storage, not shown, having a capacity for one picture, only scanning left picture storage 6 each and every time it has completed to transfer a picture to left projector 2. Thus, a projected picture consisting of parts from two pictures is avoided.

Figure 2:
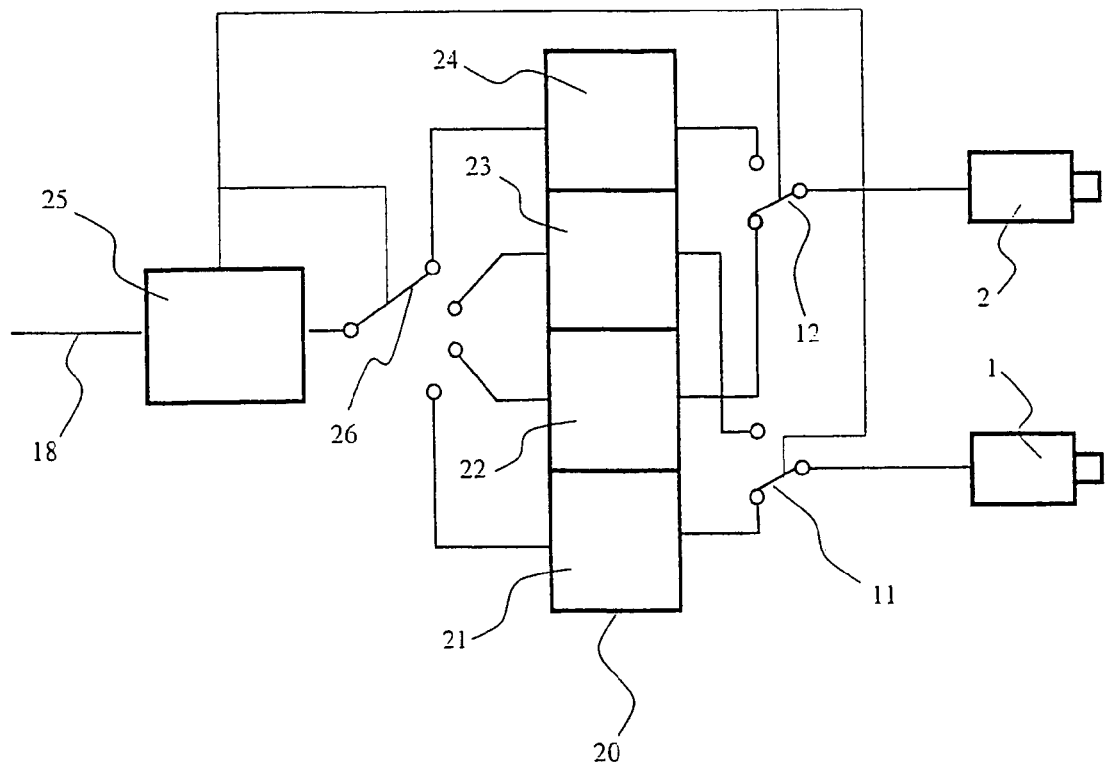
FIG. 2 shows a simplified block scheme for a second embodiment of the invention.

A second and preferred embodiment of the invention is shown in FIG. 2, where the projectors 1, 2 are connected to a common picture storage 20 through a picture 11 selector and 12 of their own, respectively. Possible picture generator for each of the projectors 1, 2 is not shown, but it may be disposed correspondingly to the described one. The picture storage 20 is divided into four picture areas 21, 22, 23, 24. A controller 25 is adapted to read and store a picture signal in the conductor 18 into one of the picture areas 21, 22, 23, 24 of picture storage 20 through an area selector 26. Pictures are stored in consecutive succession, so that first picture is stored in picture area 21, the next in 22 and so forth until all picture areas have been used. The next picture is stored in 21, and the process repeats itself, the picture storage 20 being organized as a ring buffer.

Through its picture selector 11, projector 1 reads a picture stored in picture area 21 or 23. Through its picture selector 12, projector 2 reads a picture stored in picture area 22 or 24. Thus, each projector 1, 2 reads every second picture from the picture storage 20.

The alternating cycle for the picture selectors 11 and 12 is adjusted such that the gathered projected picture becomes as free of flicker as possible. The picture cycle at each projector 1, 2 may e.g. be equal to half of the cycle of the incoming pictures when it is lower than one predetermined value and, thereupon, restricted to an upper picture cycle if a the incoming picture cycle increases beyond the same. Typically, the incoming picture cycle should be lower than 85 pictures per second causing a corresponding outgoing picture cycle. Above this limit, e.g. outgoing picture cycle may be halved.

Likewise, the picture cycle to each projector 1, 2 can be restricted to a minimum value, so that a stable picture is maintained at an incoming picture signal which has an extremely low cycle.

Accordingly, the present invention has been described with some degree of particularity directed to the preferred embodiments of the present invention. It should be appreciated, though, that the present invention is defined by the following claims construed in light of the prior art so that modifications or changes may be made to the preferred embodiments of the present invention without departing from the inventive concepts contained herein.

I claim:

1. A method for stereo projection of pictures, represented by incoming odd and even numbered picture signals, alternating cyclically between a picture intended for the right eye and a picture intended for the left eye, whereby first and, thereafter each odd numbered picture signal received, is transferred to a first projector, and whereby second and, thereafter each even numbered picture signal received, is transferred to a second projector, said picture signals for odd numbered pictures being decoded and stored in a first picture storage which is scanned periodically and projected by said first projector, and said picture signals for even numbered pictures being decoded and stored in a second picture storage which is scanned periodically and projected by said second projector and wherein said first picture storage and said second picture storage are each divided into a plurality of picture storage areas each said picture storage area capable of storing a picture and selectable for scanning of a stored picture or for storing a picture, and when one picture storage area in the first picture storage is selected for scanning by the first projector, a different picture storage area in the first picture storage is selected for storing, and when one picture storage area in the second picture storage is selected for scanning by the second projector, a different picture storage area in the second picture storage is selected for storing.

2. A method according to claim 1 whereby said plurality of picture storage areas in said first picture storage are periodically and alternately scanned, and whereby plurality of picture storage areas in said second picture storage are periodically and alternately scanned.

3. A method according to claim 1 whereby the first and second projectors each project pictures at the same time.

4. A method according to claim 1 whereby the first projector only projects the first and, thereafter, each odd numbered picture received, and whereby the second projector only projects the second and, thereafter, each even numbered picture received.

5. A method according to claim 1 whereby the first picture storage is scanned by a first picture generator that is coupled to the first projector, and whereby the second picture storage is scanned by a second picture generator that is coupled to the second projector.

6. A method according to claim 5 whereby each of the first picture generator and the second picture generator is able to scan its associated picture storage at a scanning rate different than an incoming rate of the incoming picture signal.

* * * * *